United States Patent [19]

Popivalo

[11] Patent Number: 4,901,801

[45] Date of Patent: Feb. 20, 1990

[54] HAND IMPLEMENT HAVING ALTERNATELY USABLE TOOTH AND BLADE ASSEMBLIES

[75] Inventor: Andrew G. Popivalo, Sanger, Calif.

[73] Assignee: James R. Walton, Sanger, Calif.; a part interest

[21] Appl. No.: 161,043

[22] Filed: Feb. 26, 1988

[51] Int. Cl.[4] ............................................. A01B 1/20
[52] U.S. Cl. .................... 172/375; 172/380; 56/400.06; 254/132; 294/51
[58] Field of Search ............... 172/371, 375, 378, 380, 172/381, 377, 372–374, 376; 56/400.06, 400.07, 400.11, 400.21; 294/51, 54.5, 52; 254/227, 132, 131, 131.5, 133, 130

[56] References Cited

U.S. PATENT DOCUMENTS

| | | | |
|---|---|---|---|
| 97,368 | 11/1869 | Duckwitz . | |
| 196,265 | 10/1877 | Stump . | |
| 240,650 | 4/1881 | Bradford | 294/51 |
| D. 274,116 | 6/1984 | Lidikay et al. . | |
| 332,350 | 12/1885 | Kretsinger | 172/380 X |
| 529,562 | 11/1894 | Mortenson | 172/375 X |
| 1,127,233 | 2/1915 | Hadford | 172/375 |
| 1,422,090 | 7/1922 | Dickie | 172/375 |
| 1,528,843 | 3/1925 | Olesen . | |
| 1,573,222 | 2/1926 | Coelho | 172/375 X |
| 1,666,374 | 4/1928 | Gatti | 172/375 |
| 1,683,395 | 9/1928 | Oakland | 172/375 X |
| 1,865,671 | 7/1932 | Breen | 254/132 |
| 2,166,015 | 7/1939 | Mikkelson | 254/132 |
| 2,536,180 | 1/1951 | Hines | 172/375 X |
| 2,592,990 | 4/1952 | Wolf . | |
| 3,164,213 | 1/1965 | Lutz | 56/400.06 X |
| 3,293,674 | 12/1966 | Sapia | 254/132 X |
| 4,157,119 | 6/1979 | Litchfield | 172/375 |
| 4,167,217 | 9/1979 | Tarantino . | |
| 4,476,939 | 10/1984 | Wallace | 172/375 X |
| 4,483,133 | 11/1984 | Pasley | 172/375 X |

FOREIGN PATENT DOCUMENTS 116525  6/1918  United Kingdom .

Primary Examiner—Randolph A. Reese
Assistant Examiner—Jeffrey L. Thompson
Attorney, Agent, or Firm—Worrel & Worrel

[57] ABSTRACT

A hand implement for cultivating the surface of the earth, the implement including an elongated shaft which mounts at its distal end a toothed assembly and a blade is mounted on the toothed assembly, the toothed assembly and blade so disposed relative to each other to form a pair of fulcrums interoperable to deploy the toothed assembly and blade for a multiplicity of earth working operations including weeding, permitting weeds to be cut off at uniform depths below the earth's surface or alternatively extracted from the earth in their entirety.

4 Claims, 3 Drawing Sheets

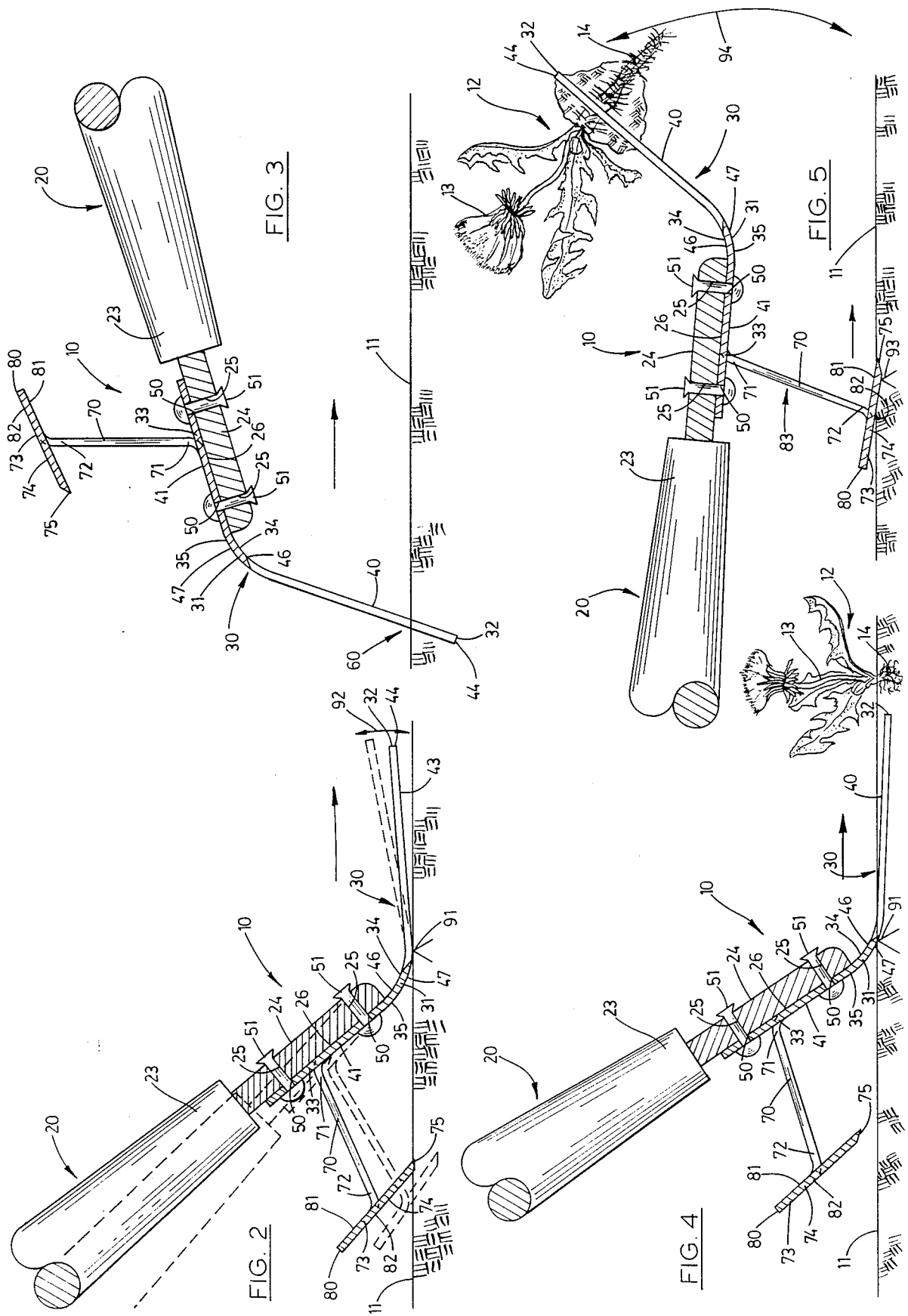

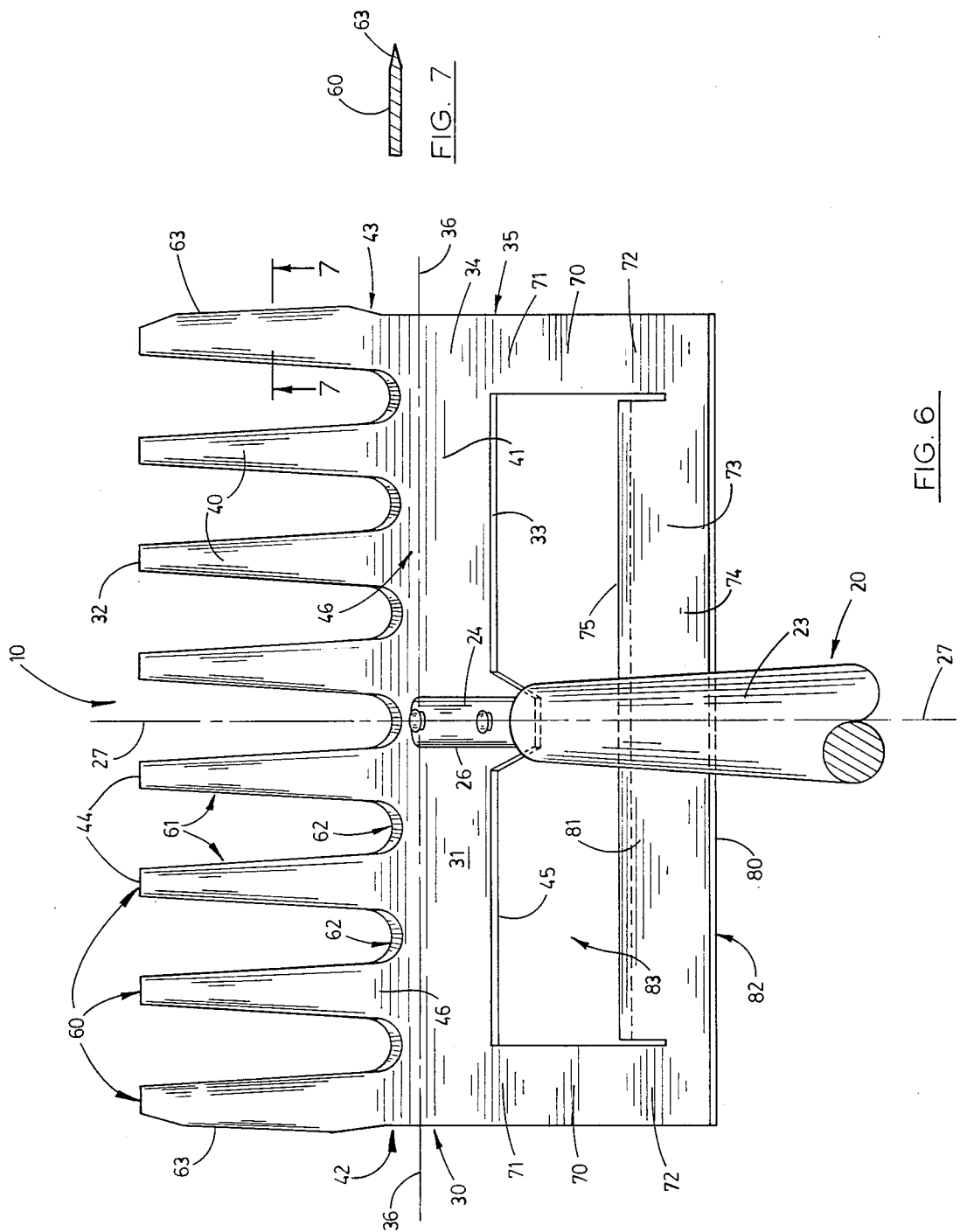

HAND IMPLEMENT HAVING ALTERNATELY USABLE TOOTH AND BLADE ASSEMBLIES

BACKGROUND OF THE INVENTION

1. Field of the Invention:

The present invention relates to a hand implement and more particularly to such an implement which is employed to cultivate the surface of the earth, the subject invention having particular utility when used in weeding operations and operable to perform assorted weeding tasks in a highly efficient fashion.

2. Description of the Prior Art:

The prior art is replete with numerous examples of assorted agricultural implements, hand tools and the like which are operable to perform assorted weeding and other soil cultivating tasks. As should be understood, one of the most arduous, time consuming, and least desirable duties encountered in growing a garden of any size or in attending flower beds or other cultivated areas is the task of weeding. While large scale agriculture addresses the problem of weeding by utilizing chemical sprays which destroy the weeds, or alternatively by employing mechanical weeding machinery which scarify the earth in an effort to tear or pull the weeds out by the roots, these same techniques cannot be employed in a cost effective manner in relatively small gardens such as, for example, by the home owner. As a result, tools such as rakes, hoes, spades and the like or alternatively, the hands are commonly employed in such weeding chores.

While it is well understood that the utilization of these prior art devices has the effect of causing weeding operations to be somewhat easier, the devices, however, suffer from a multiplicity of drawbacks which have detracted from their usefulness. For example, gardeners will typically employ a hoe or other similar devices to loosen the soil or to cut the weeds off at a predetermined distance below the earth's surface and will thereafter gather together the top portions of the weeds for disposal. While this weeding technique operates with some degree of success, it has a common shortcoming inasmuch as the roots of many weeds are left in the soil with the attendant result that the weeds grow back shortly thereafter and weeding must be repeated. Moreover, the prior art devices have not, as a general matter, been capable of cutting the weeds off at a uniform depth below the surface of the earth thereby facilitating the removal of significant portions of their respective root structures.

Still another significant problem with the prior art devices results from characteristics inherent in their design inasmuch as the prior art devices have not generally been operable to engage and uproot weeds which have deeply seated root systems with the attendant result that several tools must be serially employed for the purpose.

Therefore, it has long been known that it would be desirable to have a hand implement which has particular utility in weeding operations, the implement operable substantially to reduce the time and labor required to weed gardens and other cultivated areas while simultaneously increasing the effectiveness thereof with the attendant benefits to be derived from such effective weeding operations.

SUMMARY OF THE INVENTION

Therefore, it is an object of the present invention to provide an improved hand implement.

Another object is to provide such an implement which has particular utility when conducting weeding operations, the implement including a toothed assembly and a blade which are individually operable to cut weeds at a predetermined distance below the surface of the earth.

Another object is to provide such an implement which defines two fulcrums, the pair of fulcrums individually operable to permit the toothed assembly and the blade to be positioned in assorted attitudes to accomplish various weeding tasks.

Another object is to provide such an implement which increases the speed and thoroughness with which weeding operations can be conducted.

Another object is to provide such an implement that permits an operator to engage and thereafter uproot weeds which have tenacious or otherwise deeply seated root structures.

Another object is to provide such an implement which is characterized by simplicity of design, ease of employment and which can be sold at a relatively nominal price.

Another object is to provide such an implement which is operable to obtain the individual benefits to be derived from related prior art devices while avoiding the detriments individually associated therewith.

Further objects and advantages are to provide improved elements and arrangements thereof in an implement for the purposes described which is dependable, durable, and effective in accomplishing its intended purposes.

These and other objects and advantages are achieved in the hand implement of the present invention wherein, in the preferred embodiment, a rake like structure is mounted on the distal end of an elongated shaft, and a blade is mounted on the rake and disposed in spaced relation thereto, the rake and the blade defining individual fulcrums, and the shaft is operable when moved about the individual fulcrums to impart improved performance characteristics to the blade and rake respectively.

BRIEF DESCRIPTION OF THE DRAWINGS

FIG. 2 is a somewhat enlarged, fragmentary, transverse vertical section taken along line 2—2 of FIG. 1 and showing an alternate position for the implement in phantom lines.

FIG. 3 is a second somewhat enlarged, fragmentary, transverse vertical section taken from a position indicated by line 2—2 of FIG. 1, showing the implement inverted for use in a manner similar to a rake.

FIG. 4 is a third somewhat enlarged, fragmentary, transverse, vertical section taken from a position indicated by line 2—2 of FIG. 1 and showing the rake like portion of the implement disposed below the surface of the earth.

FIG. 5 is a fourth somewhat enlarged, fragmentary, transverse vertical section taken from a position indicated by line 2—2 of FIG. 1 and illustrating still another manner of movement of the implement.

FIG. 6 is a fragmentary top plan view of the hand implement of the subject invention.

FIG. 7 is a somewhat enlarged transverse vertical section taken along line 7—7 of FIG. 6.

DESCRIPTION OF THE PREFERRED EMBODIMENT

Figure 1:
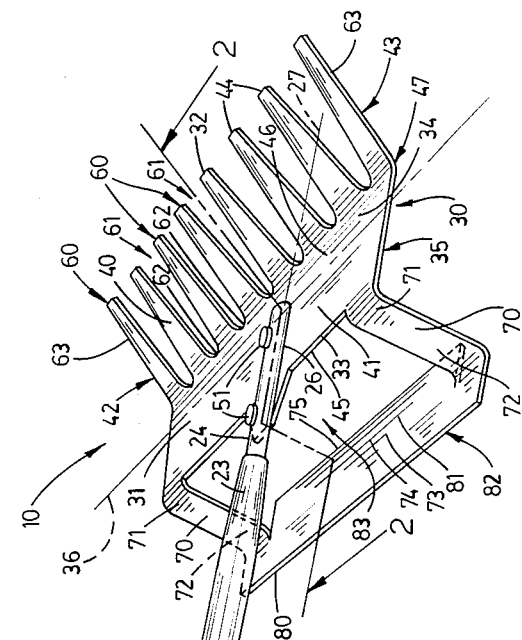
FIG. 1 is a perspective view of the hand implement of the present invention.
Figure 9:
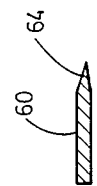
FIG. 9 is a somewhat enlarged transverse vertical section taken on line 9—9 of FIG. 8.

Referring more particularly to the drawings, the hand implement embodying the principles of the present invention is generally indicated by the numeral 10 in FIG. 1. For illustrative convenience, the implement is shown and described herein in a typical operative environment. More specifically, and as shown most clearly by reference to FIGS. 2 through 5, the implement of the present invention is shown operatively engaging the surface of the earth 11 where it is utilized to perform assorted earth working tasks which are associated with the removal of weeds 12 from the earth. As should be understood, in removing weeds from the earth, it is highly desirable to remove the entire weed; that is, the top portion 13 and the lower portion or root structure 14. This, of course, substantially inhibits recurrent growth.

The implement 10 is mounted endwardly of an elongated shaft or handle 20 that has a first or proximal end 21 which defines a gripping surface 22, and a distal end 23. A reduced diameter shaft 24 is mounted to the distal end of the shaft 20 and extends outwardly therefrom. The shaft 20 typically is manufactured from a suitable wood product, and the reduced diameter shaft is usually manufactured out of a metal alloy or other rigid synthetic material. As shown herein, the reduced diameter shaft is slidably mounted in the manner of a pressure fit in a reduced diameter channel formed in the shaft 20, the reduced diameter channel is not shown however. As best seen by reference to FIG. 2, the shaft 20 has a pair of individual channels 25, and a substantially planar surface 26 formed therein. Further, the shaft 20 has a longitudinal axis which is generally indicated by the line labeled 27.

A toothed assembly or rake like structure, hereinafter referred to as a rake for illustrative convenience and generally indicated by the numeral 30, is mounted on the distal end 23 of the shaft 20 and is affixed to the reduced diameter shaft 24. The rake has a main body 31 with a first or proximal end 32 and a second or distal end 33. Further, the main body has a top surface 34, a bottom surface 35 and a longitudinal axis generally indicated by the line labeled 36. As best seen by reference to FIG. 6, the longitudinal axis 36 of the rake 30 is substantially transverse to the longitudinal axis 27 of the shaft 20.

The main body 31 of the rake 30 has a first portion 40, and a second portion 41 which are individually disposed at a substantially obtuse attitude one with the other. Further, the main body has opposite sides or edges hereinafter referred to as a left side 42 and a right side 43, respectively. The left and right sides are substantially parallel one with the other. The first portion of the main body has a forwardly disposed or leading edge 44, and the second portion has a rearwardly disposed or trailing edge 45. As best seen by reference to FIG. 5, a concavely curved surface 46 is formed in the top surface 34, and is disposed between the first and second portions thereof and an opposed convexly curved surface 47 is formed in the bottom surface 35. A pair of orifices 50 are individually formed in the second portion of the main body and are disposed in registry with the pair of channels 25. The pair of orifices 50, and the channels 25, are individually conformably adapted slidably to receive individual rivets which are indicated by the numeral 51, and which are operable to secure the main body to the reduced diameter shaft.

Figure 8:
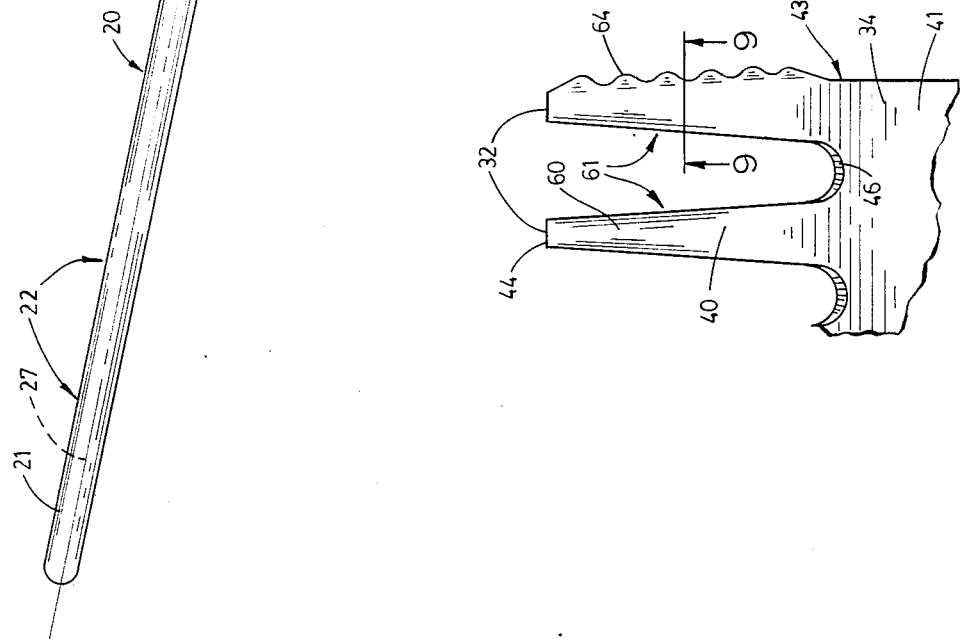
FIG. 8 is a fragmentary plan view of the hand implement of the subject invention, and showing an alternative configuration to that illustrated in FIG. 7.

A plurality of teeth 60 are formed in substantially equally spaced positions along the first portion 40 of the main body 31. The plurality of teeth define a multiplicity of channels 61. As can best be seen by reference to FIGS. 1 and 6, each channel has a rearwardly disposed surface 62 which can be sharpened or honed in order to provide a multiplicity of additional cutting edges for the implement 10. As illustrated most clearly by reference to FIGS. 6 and 8, a pair of cutting edges 63 are individually disposed on the left and right sides 42 and 43, respectively, and in close proximity to the leading edge 44. These individual edges permit the implement 10 to be utilized next to buildings, foundations, and other similar structures, not shown. As shown most clearly in FIG. 6, the pair of cutting edges 63 are substantially straight in their configuration. However, and as illustrated most clearly in FIG. 8, an alternative configuration of the same edge is illustrated as that of a substantially serrated or undulating edge 64.

A pair of arms 70 are individually mounted to the second portion 41 of the main body and are disposed in a substantially oblique attitude thereto. The pair of arms, which are mounted in substantially parallel fixed spaced relation one with the other, each have first ends 71 which are affixed to the second portion of the main body, and second ends 72 which are individually mounted to a blade which is generally indicated by the numeral 73. The blade has a main body 74 with a sharpened forwardly disposed edge 75 and a rearwardly disposed, or trailing edge 80. As should be understood, and as can best be imagined by a study of FIG. 1, the rearwardly disposed edge 80 could be sharpened in order to provide an additional cutting edge for the implement 10. Further, the blade 73 could be modified in a fashion to permit the attachment, by screws or other suitable fasteners, of a supplementary blade, not shown, this blade individually permitting the implement 10 to be rapidly converted into a grass whip, of sorts, which would permit the operator to cut off the top portion 13 of the weeds 12. This supplementary blade could be manufactured in assorted configurations including straight, serrated or undulating forms. The main body 74 of the blade 73 has a top surface 81 and a bottom surface 82; and a rectangularly shaped window 83 is defined by the pair of arms 70, the second portion 41, and the blade 73. The window is operable to permit earth to pass therethrough when the blade 73 is being utilized to cut weeds at predetermined depths below the surface of the earth 11. The operation of the implement 10 will hereinafter be discussed in greater detail.

As best appreciated by a study of FIGS. 2 and 4, the convexly curved surface 47 is operable to function as a first fulcrum point 91 which permits the first portion 40 of the rake 30 to be positioned in any attitude therealong the first arcuately shaped path of travel which is indicated by the line labeled 92. Further, it should be understood that movement of the shaft 20 about the first fulcrum can cause the blade 73 to be positioned in such an attitude that it engages and descends below the surface of the earth 11. In this position the blade can be urged along by the operator at a predetermined depth thereby cutting the weeds 12 off at uniform distances below the surface of the earth. As the blade is urged forward the earth above the blade passes through the window 83 thereby permitting the implement to slide forward. As earlier discussed, the movement of the shaft 20 about the first fulcrum causes the first portion of the rake to be positioned in various attitudes along the first path of travel. As shown most clearly in FIG. 4, the first portion can be positioned below the surface of the earth 11 and utilized in that fashion similarly to cut weeds off at a predetermined uniform depth below the earth's surface. It should be readily recognized, therefore, that the adjustment of the elongated shaft about the first fulcrum has the effect of causing the first portion of the rake or alternatively the blade 73 to be disposed at uniform depths below the earth's surface.

A second fulcrum 93 is defined by the bottom surface 82 of the blade 73. As should be understood, an operator, not shown, will from time to time encounter a weed 12, that in his judgment, should be uprooted in its entirety, as opposed to being cut off at a location below the surface of the earth 11, with the attendant result that the weed's root structure 14 is left in the earth. When this set of circumstances develops, the operator positions the first portion 40 of the rake 30 in a predetermined attitude below the surface of the earth 11 and maneuvers the rake in a forward direction and into such a position that the root structure 14 of the weed 12 to be removed is positioned in one of several of the channels 61 defined by the several teeth 60.

After accomplishing this task, and as best imagined by a study of FIGS. 4 and 5, the operator moves the shaft 20 about the first fulcrum 91 until the bottom surface 82 of the blade 73 comes in contact with the surface of the earth. At this point, the continued movement of the shaft 20 takes place about the second fulcrum 93; this movement translating into a corresponding movement of the first portion 40 along the second substantially arcuately shaped path of travel 94. As illustrated most clearly in FIG. 5, this movement along the second path of travel has the effect of positioning the first portion of the rake in predetermined spaced relation above the surface of the earth 11 and thereby causes the weed and its entire root structure to be pulled or otherwise uprooted from the earth in a highly efficient fashion. The positioning of the second fulcrum in close proximity to the distal end 23 of the shaft 20 permits the operator to exert considerable physical force on the weed 12 thereby causing even the most tenacious and deeply seated root structure 14 to become dislodged from the earth. As best illustrated by reference to FIG. 3, the implement 10 can be utilized in a manner similar to that of a rake and for purposes of cultivating or scarifying the surface of the earth 11.

OPERATION

The operation of the described embodiment of the present invention is believed to be readily apparent and is briefly summarized at this point.

The hand implement 10 which has utility when employed to cultivate the surface of the earth 11 and in particular is quite effective when utilized in weeding operations. Movement of the shaft 20 about the first fulcrum point 91 has the effect of positioning the first portion 40 of the rake 30 in any of numerous predetermined attitudes along the first path of travel 92. As shown most clearly by reference to FIG. 4, the operator can position the first portion of the rake in an attitude below the surface of the earth 11 and can further urge the rake in a forward direction and at a uniform depth below the same surface for purposes of cutting the weeds 12 off at a predetermined substantially uniform depth below the surface of the earth. Moreover, by positioning the shaft 20 in predetermined positions about the first fulcrum point, the operator can cause the blade 73 to descend below the surface of the earth and be placed at a uniform depth such that it can be utilized also to cut weeds off at a uniform depth below the surface of the earth. This is depicted most clearly by reference to FIG. 2.

The shaft 20, when moved about the second fulcrum point 93, is operable to cause the hand implement 10 to uproot selected weeds 12 which have deeply seated or otherwise tenacious root structures 14. In particular, the first portion 40 of the rake 30 is positioned by the operator below the surface of the earth 11 and in such an attitude that the root structure 14 of the weed 12 is positioned in one of the channels 61 defined by adjoining teeth 60. Movement of the shaft 20 about the second fulcrum point 93 causes the first portion 40 of the rake 30 to be urged along the second path of travel 94 with the attendant result that the weed 12 and its associated root structure 14 is pulled in its entirety out of the earth. This is illustrated most clearly by reference to FIG. 5.

Therefore, it will be seen that the hand implement 10 is operable to enhance the efficiency and speed with which assorted cultivating tasks can be performed, provides a fully dependable and practical means by which weeds can be cut at predetermined and uniform depths below the earth's surface, or alternatively can be engaged by the implement and uprooted in their entirety thereby removing the weed's root structure and the attendant benefits associated therewith, and further is operable to be utilized in a manner similar to that of a rake; the implement being of both sturdy and dependable construction and relatively inexpensive to manufacture and maintain.

Although the invention has been herein shown and described in what is conceived to be the most practical and preferred embodiment, it is recognized that departures may be made therefrom within the scope of the invention which is not to be limited to the illustrative details disclosed.

Having described my invention, what I claim as new and desire to secure by Letters Patent is:

1. An implement for working the surface of the earth in a variety of earth working movements, the implement comprising:
   a handle, extending substantially along a longitudinal axis, for grasping by an operator to move the implement in said variety of earth working movements; and
   a substantially flat plate mounted on said handle having bends formed therein extending along three spaced courses disposed in substantially right angular relation to said longitudinal axis of the handle, an outer two of said bends being convex in a direction substantially facing away from said handle to form two spaced substantially parallel fulcrum surfaces and a central one of said bends being convex in a direction substantially facing toward said handle and portions of said plate outwardly from said outer two of said bends forming distinct earth working tools deployed for earth working movement selectively individually using said fulcrum surfaces.

2. The implement of claim 1 wherein one of said earth working tools has a plurality of prongs and the other of said tools has a blade for earth working engagement.

3. The implement of claim 1 wherein one of said tools is formed by a portion of said plate between one of said outer two of said bends and the central one of said bends being severed along courses substantially at right angles to the courses of said bends and deployed in a direction facing substantially away from said handle for earth working engagement.

4. The implement of claim 1 wherein one of said earth working tools has a plurality of prongs defining a substantially common first plane and the other of said earth working tools has a blade disposed substantially in a second plane and said first and second planes are substantially oblique to each other.

* * * * *